United States Patent Office 3,733,351
Patented May 15, 1973

3,733,351
PRODUCTION OF 2-METHYLENE-GLUTARONITRILE
Yoshihisa Watanabe and Makoto Takeda, Inashiki-gun, Ibaraki-ken, Japan, assignors to Mitsubishi Petrochemical Company, Limited, Tokyo-to, Japan
No Drawing. Filed Apr. 25, 1969, Ser. No. 819,472
Claims priority, application Japan, Apr. 30, 1968, 43/28,989; Sept. 21, 1968, 43/68,513
Int. Cl. C07c 121/20, 121/30
U.S. Cl. 260—465.8 D        7 Claims

ABSTRACT OF THE DISCLOSURE

Catalytic dimerization of acrylonitrile is carried out with the use, as the catalyst, of a combination of one or more metal halogenides or metal halides, e.g., a metal chloride, and one or more trialkylamines. The metal halogenides are each representable by the general formula MeX$n$ (where Me is zinc, aluminum, titanium, vanadium, iron, or cobalt, X is a halogen, and $n$ is equal to the valence of the metal Me), and the trialkylamines are each representable by the general formula

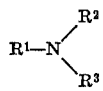

(where $R^1$, $R^2$, and $R^3$ are respectively alkyl groups).

BACKGROUND OF THE INVENTION

This invention relates to the production of methyleneglutaronitriles and more particularly to a new process for selectively producing 2-methyleneglutaronitrile by dimerising acrylonitrile.

Catalytic dimerisation of acrylonitrile to produce 2-methyleneglutaronitrile is known, and for the catalyst in this process, various phosphines and a wide variety of metal carbonyls have been known as being suitable.

SUMMARY OF THE INVENTION

It is an object of the present invention to provide a process whereby, through the use of a new class of catalysts differing from those used heretofore, as mentioned above, 2-methyleneglutaronitrile can be advantageously and selectively produced. We have found that this object can be achieved by using a specific catalyst of the metal halogenide/trialkylamine class.

According to the present invention, briefly summarised, there is provided a process as stated above which is characterised by the dimerisation of acrylonitrile with the use of a catalyst consisting, essentially, of a combination of at least one metal halogenide or metal halide representable by the general formula MeX$n$ (where Me is zinc, aluminum, titanium, vanadium, iron, or cobalt; X is a halogen; and $n$ is a number equal to the valence of the metal Me) and at least one trialkylamine representable by the general formula

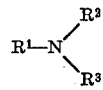

(where $R^1$, $R^2$, and $R^3$ are respectively alkyl groups).

Through the use of the class of catalysts of the invention, there is provided a new technique for producing 2-methyleneglutaronitrile. We have found that, in addition, 2-methyleneglutaronitrile can be produced, in general, more selectively than in the case wherein the known catalyst as mentioned above is used.

The nature, details, and utility of the invention will be more clearly apparent from the following detailed description beginning with general considerations and concluding with specific examples of practice constituting preferred embodiments of the invention.

DETAILED DESCRIPTION

As mentioned hereinabove, one component of a catalyst of the class according to the invention is at least one specific metal halogenide. Examples of suitable metal halogenides are zinc chloride, zinc bromide, zinc iodide, aluminum trichloride, titanium trichloride, titanium tetrachloride, vanadium trichloride, vanadium tetrachloride, aluminum tribromide, titanium tetrabromide, vanadium tribromide, aluminum triiodide, titanium tetraiodide, iron dichloride, iron dibromide, iron diiodide, cobalt dichloride, cobalt dibromide, and cobalt diiodide.

Of these halogenides, chlorides are preferable at least for economical reasons. A metal halogenide wherein the metal is iron or cobalt is preferably a dihalide. Use of iron trichloride or ferric chloride in combination with a trialkylamine results in the production of a relatively small quantity of 2-methyleneglutaronitrile. Mixtures of two or more of these metal halogenides may be used as one component of a catalyst of the class according to the invention.

The other component of a catalyst of the instant class is at least one trialkylamine. The alkyl radicals in this trialkylamine may be mutually the same, or they may be different, and the number of carbon atoms is preferably less than eight. Examples of suitable trialkylamines are trimethylamine, triethylamine, tripropylamine, tributylamine, triisobutylamine, trihexylamine, trioctylamine, and methyldiethylamine. Mixtures of two or more of these trialkylamines may be used as one component of a catalyst of the instant class. While the action of these amines is not clearly known at present, it may be considered possible that the amine, together with the metal halogenide, forms a complex to exhibit catalytic action.

The above described two components are used in proportions suitably determined in accordance with the desired reaction. In general, the amine/metal halogenide mol ratio is from 0.1 to 20, a particularly preferable range being from 0.5 to 10. We have found that when this ratio is excessive, e.g., higher than 20, the yield of the 2-methylenglutaronitrile relative to the catalyst decreases undesirably. On the other hand, when this ratio is excessively small, e.g., less than 0.1, the reaction rate drops undesirably.

We have found that a suitable quantity of the catalyst of the invention to be used relative to acrylonitrile is such that quantity by weight of the metal halogenide is greater than 0.5 percent of that of the acrylonitrile. Ordinarily, this quantity is of the order of from 2 to 10 percent by weight.

In the process for producing 2-methyleneglutaronitrile according to the invention, any procedure which secures and maintains sufficient contact between the catalyst and the acrylonitrile can be used. A reaction solvent is not especially needed, and the above described catalyst components can be added separately or mixed beforehand and then added to the acrylonitrile.

If desired, however, a solvent can be used, in which case it is possible to prevent to some extent the formation of high polymers as by-products. As a reaction solvent, a solvent which does not have active hydrogen other than water or an alcohol can be used in general and can be selected, for example, from among solvents which dissolve and do not dissolve the 2-methyleneglutaronitrile to be formed. Examples of such solvents are nitriles such as acetonitrile, propionitrile, and benzonitrile and aromatic hydrocarbons such as benzene, toluene, and xylene.

The reaction temperature and pressure may be selected at will from values thereof which will maintain the acrylonitrile in the liquid phase. Ordinarily, a temperature of from 0 to 70 degrees C. at atmospheric pressure is preferable.

When desired for the purpose of preventing the by-production of high polymers of the acrylonitrile, a radical polymerisation inhibitor can also be used. For such a polymerisation inhibitor, one which will not impair the dimerisation reaction may be used.

The dimerisation reaction can be carried out by a batch process or a continuous process. Furthermore, depending on the necessity, the catalyst can be reused by replenishing either or both of the components thereof.

In order to indicate still more fully the nature and utility of the invention, the following specific examples of practice of the invention and results are set forth, it being understood that these examples are presented as illustrative only and that they are not intended to limit the scope of the invention. In these examples, YIELD is expressed in percent by weight of 2-methyleneglutaronitrile based on the weight of acrylonitrile charged.

EXAMPLE 1

To 100 millilitres (ml.) of acrylonitrile in a 200-ml. Erlenmeyer flask, 3.68 grams (g.) of zinc chloride and 15.8 ml. of triethylamine were added. Then, after thorough mixing, the resulting mixture was left standing at room temperature for 20 hours, whereupon a compound of high boiling point was formed in a yield of 83.9 percent. This compound was verified as being 2-methyleneglutaronitrile as a result of N.M.R. and infrared absorption spectral measurements and gas-chromatograph analysis. It was found also that only a small quantity of high boiling point compounds other than 2-methyleneglutaronitrile were contained in the formed product.

EXAMPLES 2–7, INCLUSIVE 100 ml. of acrylonitrile, 3.68 g. of zinc chloride, and 15.8 ml. or triethylamine were placed in a 200-ml. three-neck flask provided with an agitator and caused to react at a reaction temperature of 12 degrees C. (° C.) and a reaction time of 6 hours. This procedure was repeated at different reaction temperatures and times. The results of these reactions are shown in Table 1.

TABLE 1

| Example No. | Reaction Temp. (° C.) | Reaction Time (hr.) | 2-methyleneglutaronitrile yield (wt. percent) | Other products (wt. percent) |
|---|---|---|---|---|
| 2 | 12 | 6.0 | 39.4 | Trace. |
| 3 | 20 | 5.0 | 56.8 | Do. |
| 4 | 30 | 6.0 | 63.3 | Do. |
| 5 | 50 | 8.5 | 62.1 | Do. |
| 6 | 70 | 8.0 | 42.9 | High polymer 8.0. |
| 7 | 120 | 12.0 | 32.6 | High polymer 19.8. |

EXAMPLES 8, 9 AND 10

Three batches each of 100 ml. of acrylonitrile, a specific quantity of zinc chloride differing from those of the other batches, and 15.8 ml. of triethylamine were respectively placed in a reaction flask similar to that used in Examples 2 through 7 and caused to react, whereupon the results indicated in Table 2 were obtained.

TABLE 2

| Example No. | ZnCl$_2$ (g.) | Reaction time (hrs.) | 2-methyleneglutaronitrile yield (wt. percent) | Other products (wt. percent) |
|---|---|---|---|---|
| 8 | 3.68 | 7.0 | 66.1 | Trace. |
| 9 | 7.36 | 1.0 | 47.7 | Do. |
| 10 | 8.69 | 1.0 | 50.5 | Do. |

EXAMPLES 11 AND 12

Two batches each of 100 ml. or acrylonitrile, 3.68 g. of zinc chloride, and a specific quantity of triethylamine differing from that of the other batch were respectively placed in a reaction flask similar to that used in Examples 2 through 7 and caused to react at 30° C., whereupon results as indicated in Table 3 were obtained.

TABLE 3

| Example No. | Triethylamine (ml.) | Reaction time (hrs.) | 2-methyleneglutaronitrile yield (wt. percent) | Other products (wt. percent) |
|---|---|---|---|---|
| 11 | 7.9 | 7.0 | 35.1 | Trace. |
| 12 | 31.6 | 7.0 | 66.7 | Do. |

EXAMPLE 13

100 ml. of acrylonitrile, 15.8 ml. of tri-n-propylamine, and 3.68 g. of zinc chloride were placed in the reaction flask of Examples 2 through 7 and caused to react for 6 hours, whereupon 2-methyleneglutaronitrile was obtained in a yield of 8.1 percent. Substances other than the 2-methyleneglutaronitrile were not detected in the formed product.

EXAMPLES 14, 15 AND 16

To 100 ml. of acrylonitrile in a 200 ml. Erlenmeyer flask, each of the zinc halogenides in a specific quantity as set forth in Table 4, and 15.8 ml. of triethylamine were added. Then, after thorough mixture, the resulting mixture was caused to react at 20° C. for 8 hours.

The results indicated in Table 4 were obtained.

TABLE 4

| Example No. | Zinc halogenide Type | Zinc halogenide Quantity, g. (mol) | 2-methyleneglutaronitrile yield (wt. percent) | Other products (wt. percent) |
|---|---|---|---|---|
| 14 | ZnCl$_2$ | 3.89 (0.028) | 54.5 | 2.6 |
| 15 | ZnBr$_2$ | 6.14 (0.027) | 69.7 | 3.8 |
| 16 | ZnI$_2$ | 9.54 (0.029) | 78.9 | 6.3 |

NOTE: The "other products" consisted mainly of trimer of acrylonitrile.

Reference example (for comparison)

Several batches each of 100 ml. of acrylonitrile, 3.68 g. of zinc chloride, and an amine, other than the trialkylamine according to the invention, thus differing from that of other batches, were respectively placed in a 200-ml., three-neck flask provided with an agitator and caused to react. The particulars of these processes and the results as shown in Table 5.

TABLE 5

| Ref. Example No. | Amine (ml. except 3) | Reaction Temp. (° C.) | Reaction Time (hrs.) | 2-methyleneglutaronitrile yield (percent) |
|---|---|---|---|---|
| 1 | n-Butylamine (15.8) | 30 | 4.5 | No reaction. |
| 2 | do | 120 | 6.0 | Not produced (high polymers formed). |
| 3 | Tribenzylamine (16.3 g.) | 30 | 5.0 | No reaction. |
| 4 | Triethanolamine (14.8) | 30 | 6.0 | Do. |
| 5 | N,N-dimethylaniline (15.8) | 30 | 6.5 | Do. |
| 6 | Pyridine (15.8) | 120 | 6.0 | Do. |
| 7 | Piperidine (15.8) | 120 | 6.0 | 0.3 (high polymers 95.4). |

From these results, the critical nature of the trialkylamine used, in accordance with the invention is apparent.

EXAMPLES 17, 18 AND 19

Three batches were prepared, in each case by placing a specific quantity of aluminium trichloride in a stainless-steel, 200-ml. autoclave provided with an agitator and adding thereto 15.8 ml. of triethylamine and 100 ml. of acrylonitrile. Each batch was caused to react at 30° C. during a reaction time differing from those of the other batches.

The resulting product in each case was found to be almost entirely 2-methyleneglutaronitrile, containing as a by-product only a small quantity of acrylonitrile trimer. The particulars and results of the above described reaction are indicated in Table 6.

TABLE 6

| Example No. | Aluminum trichloride (g.) | Reaction time (hrs.) | 2-methylene-glutaronitrile yield (wt. percent) |
|---|---|---|---|
| 17 | 7.2 | 21 | 53.9 |
| 18 | 14.4 | 2 | 53.0 |
| 19 | 14.4 | 8 | 77.9 |

For reference, the procedure of Example 17 was carried out without the use of triethylamine, whereupon almost no 2-methylene-glutaronitrile was produced.

EXAMPLE 20

100 ml. of acrylonitrile, 7.2 g. of aluminium trichloride, and 15.8 ml. of tripropylamine were placed in a three-neck glass flask of 200-ml. capacity and caused to react for 40 hours at a reaction temperature of 30° C.

The resulting product was found to be almost entirely 2-methyleneglutaronitrile, containing as a by-product only a small quantity of acrylonitrile trimer. The 2-methylene-glutaronitrile yield was 16.7 wt. percent.

EXAMPLES 21 AND 22

Each of the metal halogenides set forth in Table 6 was placed in an autoclave similar to that specified in Examples 17, 18, and 19, and 15.8 ml. of triethylamine and 100 ml. of acrylonitrile were added thereto. The resulting batch was caused to react for 30 hours at 20° C.

As a result in each case, a product was which was composed almost entirely of 2-methyleneglutaronitrile with only a minute quantity of acrylonitrile trimer as a by-product was obtained in the yield shown in Table 7.

TABLE 7

| Example No. | Metal halogenide (g.) | Reaction time (hrs.) | 2-methylene-glutaronitrile yield (wt. percent) |
|---|---|---|---|
| 21 | Vanadium trichloride (5.07) | 30 | 17.6 |
| 22 | Titanium tetrachloride (5.12) | 30 | 10.5 |

EXAMPLES 23, 24 AND 25

Three batches each of 100 ml. of acrylonitrile, 3.70 g. of cobalt dichloride, and 25 ml. of triethylamine were respectively placed in a 200-ml. three-neck flask and caused to react at reaction temperatures of 20, 40, and 60° C., respectively.

The resulting product in each case was found to be almost entirely 2-methyleneglutaronitrile, containing as a by-product only a small quantity of acrylonitrile trimer. The particulars and results of these reactions are indicated in Table 8.

TABLE 8

| Example No. | Reaction Temp. (°C.) | Time (hrs.) | 2-methylene-glutaronitrile yield (wt. percent) |
|---|---|---|---|
| 23 | 20 | 6.5 | 56.0 |
| 24 | 40 | 6.0 | 56.6 |
| 25 | 60 | 6.0 | 50.0 |

EXAMPLES 26 AND 27

A first batch of 100 ml. of acrylonitrile, 3.70 g. of cobalt dichloride, and 10 ml. of triethylamine and a second batch of 100 ml. of acrylonitrile, 3.70 g. of cobalt dichloride, and 50 ml. of triethylamine were respectively placed in a reaction vessel similar to that described in Examples 23, 24 and 25 and caused to react at a temperature of 20° C.

Almost all of the resulting product was 2-methyleneglutaronitrile, there being only a small quantity of acrylonitrile trimer as a by-product. The particulars and results of these reactions are indicated in Table 9.

TABLE 9

| Example No. | Triethylamine (ml.) | Reaction time (hrs.) | 2-methylene glutaronitrile yield (wt. percent) |
|---|---|---|---|
| 26 | 10 | 6.0 | 27.7 |
| 27 | 50 | 6.5 | 56.3 |

EXAMPLE 28

100 ml. of acrylonitrile, 3.70 g. of cobalt dichloride, and 34 ml. of tri-normal-propylamine as an amine were placed in a reaction vessel similar to that specified in Examples 23, 24 and 25 and caused to react at 20° C. for 5 hours.

As a result, 5.9 wt. percent of 2-methyleneglutaronitrile was obtained with only a small quantity of acrylonitrile trimer as a by-product.

EXAMPLE 29

100 ml. of acrylonitrile, 3.53 g. of ferrous chloride, and 25 ml. of triethylamine were placed in a reaction vessel similar to that described in the preceding example and caused to react at 20° C. for 6 hours.

As a result, 28.6 wt. percent of 2-methyleneglutaronitrile was obtained with only a small quantity of acrylonitrile trimer as a by-product.

EXAMPLE 30

100 ml. of acrylonitrile, 6.16 g. of cobalt bromide, and 25 ml. of triethylamine were placed in a reaction vessel similar to that set forth in the preceding example and caused to react at 20° C. for 6 hours.

As a result, 68.3 wt. percent of 2-methyleneglutaronitrile was obtained with only a small quantity of acrylonitrile trimer as a by-product.

We claim:

1. A process for producing 2-methyleneglutaronitrile which consists essentially of catalytically dimerising acrylonitrile through the use, as a catalyst, of a combination of metal halogenides represented by the formula $MeX_n$ wherein Me is a metal selected from the group consisting of zinc, aluminium, titanium, vanadium, iron and cobalt, X is a halogen, and $n$ is a number equal to the valence of the metal Me and at least one trialkylamine represented by the formula

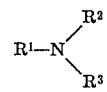

wherein $R^1$, $R^2$, and $R^3$ are respectively alkyl groups of less than 8 carbon atoms and the mol ratio of trialkylamine to metal halogenide is from 0.1 to 20.0.

2. A process for producing 2-methyleneglutaronitrile as claimed in claim 1 in which the mol ratio of said trialkylamine to said metal halogenide is in the range of from 0.1 to 20, and said catalyst is used in a quantity such that the quantity of the metal halogenide is at least 0.5 percent by weight of that of said acrylonitrile.

3. A process for producing 2-methyleneglutaronitrile as claimed in claim 1 in which said acrylonitrile is catalytically dimerised at a reaction temperature and pressure such that the acrylonitrile is maintained in the liquid phase, at a temperature of from 0 to 70° C. and at atmospheric pressure.

4. A process for producing 2-methyleneglutaronitrile as claimed in claim 1 in which said reaction is carried out in an inert reaction solvent.

5. A process for producing 2-methyleneglutaronitrile as claimed in claim 1, in which said at least one metal halogenide is a chloride.

6. A process for producing 2-methyleneglutaronitrile as claimed in claim 1, in which said trialkylamine is triethylamine.

7. A process for producing 2-methyleneglutaronitrile as claimed in claim 1 in which said metal halogenide is represented by formula $MeX_2$ wherein Me is a metal selected from the group consisting of iron and cobalt, and X is a halogen.

References Cited

UNITED STATES PATENTS

| | | | |
|---|---|---|---|
| 3,444,235 | 5/1969 | Chabardes et al. | 260—465.8 |
| 3,446,836 | 5/1969 | Lambert et al. | 260—465.8 |
| 3,484,475 | 12/1969 | Cornforth et al. | 260—465.8 |
| 3,562,311 | 2/1971 | McClure | 260—465.8 |
| 3,567,759 | 3/1971 | Tullio | 260—465.8 |
| 3,567,760 | 3/1971 | Feldman et al. | 260—465.8 |

FOREIGN PATENTS

| | | | |
|---|---|---|---|
| 1,522,836 | 3/1968 | France | 260—465.8 |

JOSEPH P. BRUST, Primary Examiner